May 28, 1929.  M. M. HARDY  1,715,286
AUTOMOBILE COVER
Filed Feb. 21, 1927   2 Sheets-Sheet 1
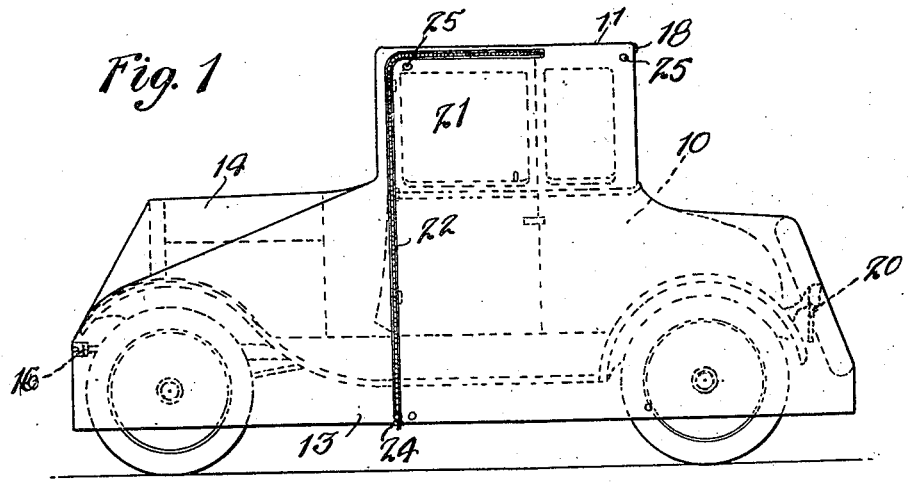
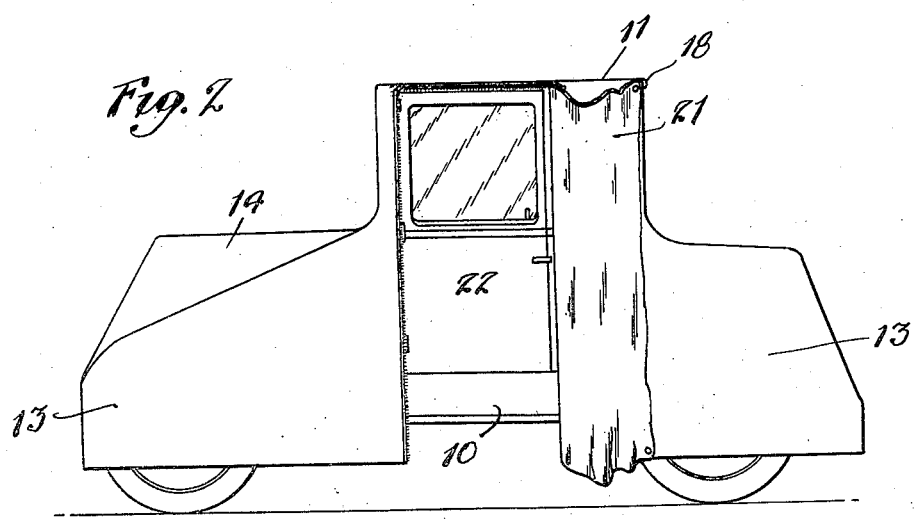
Minnie May Hardy,
Inventor May 28, 1929.　　　M. M. HARDY　　　1,715,286
AUTOMOBILE COVER
Filed Feb. 21, 1927　　　2 Sheets-Sheet 2
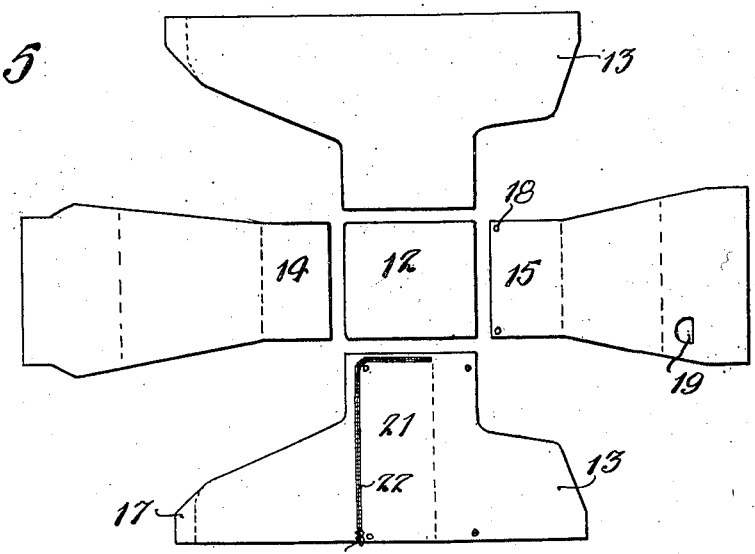
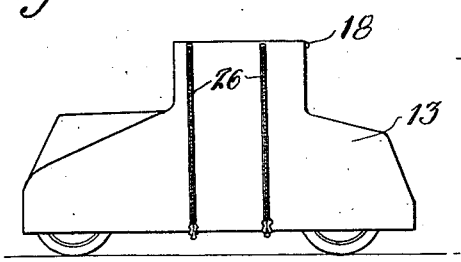
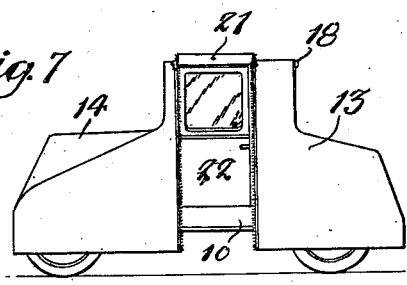
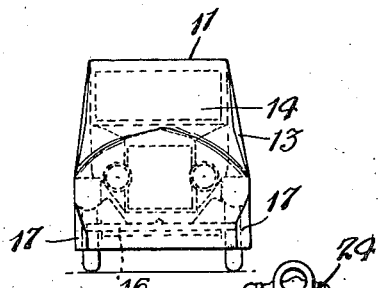
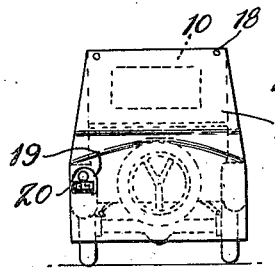
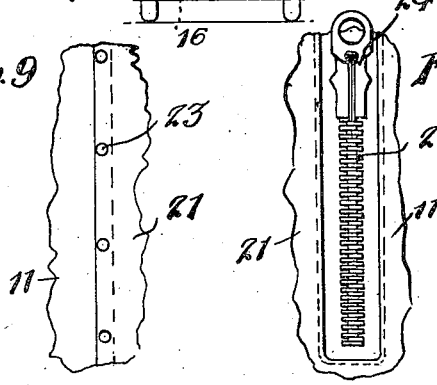
Minnie May Hardy
Inventor
Attorney Patented May 28, 1929.

1,715,286

UNITED STATES PATENT OFFICE.

MINNIE MAY HARDY, OF WASHINGTON, DISTRICT OF COLUMBIA.

AUTOMOBILE COVER.

Application filed February 21, 1927. Serial No. 169,865.

My invention relates to improvements in covers for automobiles or other vehicles.

An important object of my invention is the provision of a cover for an automobile which may be used in lieu of a garage to protect the car from the elements.

A further object of my invention is to provide a device of this character, which may be used within a garage to protect the car from dust, dampness and the like.

Another object of my invention is to provide a device of the above mentioned character which may be readily applied and removed by one person and which may be easily folded and carried in the car.

Yet another object of my invention is the provision of a device of this character which will be inexpensive to manufacture, simple in construction and operation, and durable and practical in use.

Other objects of my invention will be apparent during the course of the following description.

In the accompanying drawings which form a part of this specification and wherein like characters of reference denote like or corresponding parts through the same, Figure 1 is a side elevation of an automobile having my improved cover applied thereto, the portion of the car hidden by the cover being shown in dotted lines, Figure 2 is a similar view showing the side flap open to give access to the interior of the car, Figure 3 is a front elevation of the same, Figure 4 is a rear elevation thereof.

Figure 5 is a detail view of the cover showing the various parts of which it is composed, Figure 6 is a side elevation of a car having a cover with a modified form of flap, Figure 7 is a similar view of the same showing the flap in open position, Figure 8 is a detail view of the flap fastener, and, Figure 9 is a similar view of a modified form of fastening means.

In the drawings, wherein for the purpose of illustration is shown a preferred embodiment of my invention, the numeral 10 designates an automobile, over which my improved cover 11 is adapted to be placed. The proved cover 11 comprises five sections which are sewed or otherwise secured together to form a cover which exactly fits the contour of the car. The top portion 12 is shaped to correspond to the shape of the top of the car, here shown as rectangular. A pair of side portions 13, identical in outline, are secured to the sides of the top 12, and extend to within about eight inches, more or less, of the ground.

A front panel 14 is secured to the front edge of the top 12 and has its side edges secured to the front edges of the side panels 13. A rear panel 15 is secured to the rear edges of the side panels 13. The cover formed as described will fit over the car, covering the entire automobile, including spare tire and bumpers with the exception of the extreme lower portions of the wheels. As the bumper 16 terminates short of the outer edges of the front fenders, a gore or extension 17 is provided in the forward ends of the side panels 13 which extend diagonally across the front of the car to the edge of the bumper, as shown in Figure 3. This construction not only insures a perfect fit but also serves to retain the cover in place upon the car.

The eight seams formed by the junction of the five panels, are all arranged on the edges of the car as shown and form corners which tend to make the cover assume the shape of the car.

To assist in applying the cover to a car, snap fasteners 18 of any suitable description may be arranged in the top corners of the rear panel 15 to engage complementary fasteners on the car. In placing the cover on the car, securing of the fasteners 18 will permit the cover to be pulled over the car with ease. A substantially semi-circular opening 19 is arranged in the rear panel 15 to disclose the tail light and license plate 20.

In order to permit access to the interior of the car while the cover is arranged thereon, I provide a flap 21 adapted to be drawn back to uncover the door 22 of the car. This flap is formed by a vertically extending slit extending from the bottom of the cover to a horizontal slit arranged adjacent the top of the cover and connected with the vertical slit at its upper end. The slits in the cover are provided with any suitable type of fasteners 22 to secure the flap in position. I have illustrated my invention as provided with the fastener which is illustrated in United States Patents Nos. 1,557,382 and 1,219,881 to Gideon Sundback. This type of fastener is preferred because it is easily and quickly operated and is substantially dustproof.

Any other type of fastener may be used, however, and in Figure 9, I have illustrated the conventional snap fastener 23. The patented fastener is illustrated in detail in Figure 8 and comprises the usual fastening elements, 22' and the operating member 24.

The flap 21 is also provided with snap fasteners 25 adapted to secure the flap in open position, as shown in Figure 2, to allow the door 22 of the car to swing open.

In Figures 6 and 7, I have shown a modified form of flap formed by two spaced vertical slits closed by fasteners 26. In this form of my invention the flap can be rolled up or thrown over the top of the car to uncover the door of the car.

The cover is made of a light waterproof material and may be applied by a single person without difficulty. When not in use the cover may be folded and carried in the car. For indoor use the material may be waterproof or not, as desired. The covers may be made in different sizes and shapes to fit any make of style of car.

While I have shown and described the preferred embodiment of my invention, it is to be understood that various changes in the size, shape and arrangement of parts may be resorted to without departing from the spirit of my invention or the scope of the subjoined claims.

Having thus described my invention, what I claim and desire to protect by Letters Patent is:

1. A vehicle cover comprising a one-piece cover shaped to fit the vehicle, means to fasten the cover to the top of the vehicle to facilitate the application of the cover to the vehicle, a flap on said cover to give access to the interior of the vehicle, means to hold said flap in open position, and means to fasten the flap in closed position.

2. A vehicle cover comprising a one-piece cover shaped to fit over the vehicle and its accessories to cover the same and be retained thereon, a flap formed by a vertical slit extending to the bottom of the cover and connecting with a horizontal slit arranged adjacent the top of the cover, said slits being closed by a fastener, means to hold the flap in open position, and means to fasten the top portion of the cover to the vehicle to assist in applying the cover.

In testimony whereof I affix my signature.

MINNIE MAY HARDY.